United States Patent
Chitale et al.

(10) Patent No.: US 9,619,363 B1
(45) Date of Patent: Apr. 11, 2017

(54) PREDICTING SOFTWARE PRODUCT QUALITY

(71) Applicant: International Business Machines Corporation, Armonk, NY (US)

(72) Inventors: Poonam P. Chitale, Cupertino, CA (US); Catherine M. Cox, San Jose, CA (US); Dario D'Angelo, Los Gatos, CA (US); Xiyao Jiang, Shanghai (CN); Shahin Mohammadi-Rashedi, San Jose, CA (US); Thomas J. Pavela, San Jose, CA (US); Jeffrey S. Rhodes, San Jose, CA (US); Marian E. Sadowski, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/865,384

(22) Filed: Sep. 25, 2015

(51) Int. Cl.
  *G06F 9/44* (2006.01)
  *G06F 11/36* (2006.01)

(52) U.S. Cl.
  CPC ...... *G06F 11/3616* (2013.01); *G06F 11/3684* (2013.01)

(58) Field of Classification Search
  CPC ............. G06F 11/3616; G06F 11/3684; G06F 11/3692
  See application file for complete search history.

(56) References Cited

U.S. PATENT DOCUMENTS

| | | | | |
|---|---|---|---|---|
| 4,815,078 A | * | 3/1989 | Shimura | H04N 19/50 250/581 |
| 5,500,941 A | * | 3/1996 | Gil | G06F 11/3684 714/38.1 |
| 5,655,074 A | * | 8/1997 | Rauscher | G06F 11/3616 702/179 |
| 6,023,580 A | * | 2/2000 | Sifter | G06F 11/3672 714/E11.208 |

(Continued)

OTHER PUBLICATIONS

Tan et al., Assessing Software Quality by Program Clustering and Defect Prediction, published by IEEE computer society, 2011, pp. 244-248.*

(Continued)

*Primary Examiner* — Thuy Dao
*Assistant Examiner* — Zheng Wei
(74) *Attorney, Agent, or Firm* — David Zwick (57) ABSTRACT

Predicting software product quality. Real-time and historic software code metrics, software code defect data for the software product, and test case-related data for the software product are received. A feature predicted fallibility that estimates the number of code defects for a new feature of the software product, a product version projected fallibility that estimates the number of code defects for a new version of a software product, a test case related quality coefficient that estimates the likelihood of discovery of code defects in a new feature, a feature quality and a product quality indexes that are qualitative indications of quality of the new code of a feature and the new product version, are calculated. A report is then output that includes at least the calculated (Continued)

values, whereby developer resources are directed to features of the software product for which the calculated values indicate likelihoods of a high defect densities.

9 Claims, 6 Drawing Sheets

(56) References Cited

U.S. PATENT DOCUMENTS

| | | | | |
|---|---|---|---|---|
| 6,219,805 | B1* | 4/2001 | Jones | G06F 11/3616 714/25 |
| 6,477,471 | B1* | 11/2002 | Hedstrom | G06F 11/3616 702/34 |
| 7,735,068 | B2* | 6/2010 | Siddaramappa | G06F 11/3604 715/230 |
| 7,856,616 | B2* | 12/2010 | Chang | G06Q 10/00 714/37 |
| 8,108,689 | B2* | 1/2012 | Nicolson | G06F 21/14 713/190 |
| 8,151,146 | B2* | 4/2012 | Ostrand | G06F 11/008 714/47.1 |
| 8,271,961 | B1* | 9/2012 | Chithambaram | G06F 11/3688 717/132 |
| 8,448,127 | B2* | 5/2013 | Lindley | G06Q 10/06 705/7.12 |
| 8,539,282 | B1* | 9/2013 | Kabanov | G06F 11/3688 702/182 |
| 8,584,079 | B2* | 11/2013 | Yassin | G06F 11/3672 717/101 |
| 8,595,685 | B2* | 11/2013 | Sharma | G06F 11/3616 706/52 |
| 8,839,211 | B2* | 9/2014 | Kaulgud | G06F 11/3616 717/123 |
| 8,856,725 | B1* | 10/2014 | Anderson | G06F 8/75 717/103 |
| 8,869,116 | B2* | 10/2014 | Fliek | G06F 11/3672 714/31 |
| 8,881,112 | B2* | 11/2014 | Corsetti | G06F 8/20 717/124 |
| 8,984,489 | B2* | 3/2015 | Yassin | G06F 11/3672 717/126 |
| 9,141,920 | B2* | 9/2015 | Dunne | G06Q 10/06 |
| 9,141,921 | B2* | 9/2015 | Dunne | G06Q 10/06 |
| 9,378,015 | B2* | 6/2016 | Nagappan | G06F 11/3616 |
| 2006/0041857 | A1* | 2/2006 | Huang | G06N 3/0436 717/104 |
| 2006/0282823 | A1* | 12/2006 | Li | G06F 8/61 717/121 |
| 2007/0074151 | A1* | 3/2007 | Rivera | G06Q 10/10 717/104 |
| 2007/0226546 | A1* | 9/2007 | Asthana | G06F 11/3688 714/47.1 |
| 2007/0240038 | A1* | 10/2007 | Rundell | G06F 19/327 715/210 |
| 2008/0104577 | A1* | 5/2008 | Holden | G06F 11/3692 717/126 |
| 2008/0148225 | A1* | 6/2008 | Sarkar | G06F 8/10 717/107 |
| 2008/0155508 | A1* | 6/2008 | Sarkar | G06F 8/10 717/126 |
| 2009/0055804 | A1* | 2/2009 | Blaschek | G06F 11/3616 717/126 |
| 2009/0070734 | A1* | 3/2009 | Dixon | G06F 8/71 717/102 |
| 2009/0113427 | A1* | 4/2009 | Brady | G06Q 10/06 718/100 |
| 2009/0119515 | A1* | 5/2009 | Nicolson | G06F 21/14 713/190 |
| 2009/0164974 | A1* | 6/2009 | Corsetti | G06F 11/3616 717/123 |
| 2011/0041120 | A1* | 2/2011 | Nagappan | G06F 11/3616 717/126 |
| 2011/0231828 | A1* | 9/2011 | Kaulgud | G06F 11/3616 717/131 |
| 2011/0252394 | A1* | 10/2011 | Sharma | G06F 11/3616 717/101 |
| 2012/0110544 | A1* | 5/2012 | Novak | G06F 8/20 717/101 |
| 2012/0159420 | A1* | 6/2012 | Yassin | G06F 11/3672 717/101 |
| 2012/0260230 | A1* | 10/2012 | Choudhary | G06F 11/3616 717/105 |
| 2013/0061202 | A1* | 3/2013 | Nema | G06F 8/70 717/101 |
| 2013/0311968 | A1* | 11/2013 | Sharma | G06Q 10/06 717/101 |
| 2014/0053138 | A1* | 2/2014 | Yassin | G06F 11/3672 717/126 |
| 2014/0157239 | A1* | 6/2014 | Goetsch | G06F 11/3604 717/126 |
| 2014/0237453 | A1* | 8/2014 | Hulick, Jr. | G06F 11/3612 717/127 |
| 2014/0282419 | A1* | 9/2014 | Yoshida | G06F 11/3604 717/126 |
| 2014/0282456 | A1* | 9/2014 | Drost | G06F 8/76 717/158 |
| 2014/0365990 | A1* | 12/2014 | Nakao | G06F 8/71 717/101 |
| 2016/0019132 | A1* | 1/2016 | Vilakkumadathil | G06F 9/44589 717/126 |
| 2016/0103754 | A1* | 4/2016 | Aggarwal | G06F 11/3608 717/126 |

OTHER PUBLICATIONS

Jiang et al., Comparing Design and code Metrics for Software Quality Prediction, published by PROMISE'08, May 2008, pp. 1-8.*
Guo et al., Software Quality Prediction Using Mixture Models with EM Algorithm, published by IEEE, 2000 pp. 69-78.*
Song et al., A General Software Defect-Proneness Prediction Framwwork, published by IEEE, 2011, pp. 356-370.*
English et al., Fault Detection and Prediction in an Open-Source Software Project, published by ACM, 2009, p. 1-11.*
Caglayan et al., Usage of Multiple Prediction Models Based on Defect Categories, published by ACM, 2010, pp. 1-9.*
Tosun et al., "AI-Based Software Defect Predictors: Applications and Benefits in a Case Study," Proceedings of the Twenty-Second Innovative Applications of Artificial Intelligence Conference (IAAI 2010), Association for the Advancement of Artificial Intelligence (www.aaai.org), Copyright 2010, pp. 1748-1755.
Yu, "Using Negative Binomial Regression Analysis to Predict Software Faults: A Study of Apache Ant," I.J. Information Technology and Computer Science, 2012, vol. 8, Published Online Jul. 2012 in MECS (http://www.mecs-press.org/), pp. 63-70.
D'Ambros et al., "Evaluating Defect Prediction Approaches: A Benchmark and an Extensive Comparison," Empirical Software Engineering, vol. 17, Issue 4-5, pp. 1-46.
Moser et al., "A Comparative Analysis of the Efficiency of Change Metrics and Static Code Attributes for Defect Prediction," ICSE '08 Proceedings of the 30th International Conference on Software Engineering, May 10-18, 2008, Leipzig, Germany, Copyright 2008 ACM, pp. 181-190.
Nagappan et al., "Use of Relative Code Churn Measures to Predict System Defect Density," ICSE '05 Proceedings of the 27th International Conference on Software Engineering, May 15-21, 2005, St. Louis, MO, USA, Copyright 2005 ACM, pp. 1-9.
Shafi et al., "Software Quality Prediction Techniques: A Comparative Analysis," 2008 International Conference on Emerging Technologies, IEEE-ICET 2008, Oct. 18-19, 2008, Rawalpindi, Pakistan, pp. 1-5.
Atkeson et al., "Locally Weighted Learning," Artificial Intelligence Review, vol. 11, Issue 1-5, Feb. 1997, Kluwer Academic Publishers, Printed in the Netherlands, pp. 11-73.

(56) References Cited

OTHER PUBLICATIONS

Zimmermann, "Predicting Software Quality," thomas-zimmermann.com, http://thomas-zimmermann.com/research/predicting-software-quality/, Accessed on Jan. 14, 2015, pp. 1-5.

Bhattacharya et al., "Graph-Based Analysis and Prediction for Software Evolution," ICSE '12 Proceedings of the 34th International Conference on Software Engineering, IEEE Press, Piscataway, NJ, USA, Copyright 2012, pp. 419-429.

Nagappan et al., "Static Analysis Tools as Early Indicators of Pre-Release Defect Density," ICSE '05 Proceedings of the 27th International Conference on Software Engineering, May 15-21, 2005, St. Louis, MO, USA, Copyright 2005 ACM, pp. 580-586.

Lincke et al., "Software Quality Prediction Models Compared," Quality Software (QSIC), 2010 10th International Conference on Quality Software, Jul. 14-15, 2010, Copyright 2010 IEEE, pp. 82-91.

Mell et al., "The NIST Definition of Cloud Computing," National Institute of Standards and Technology, U.S. Department of Commerce, Special Publication 800-145, Sep. 2011, pp. 1-7.

* cited by examiner

PREDICTING SOFTWARE PRODUCT QUALITY

BACKGROUND

The present invention relates generally to the field of software quality and more particularly to predicting the quality of a software product under development.

A part of the software product development process may be to improve current product functionality and to introduce new product functionality through the release of new versions of the software. When introducing new releases of the product, an important development goal may be to ensure that quality is not compromised. Quantifying product quality is often challenging.

Product quality assessment of a new product release is often based on a comparison and analysis of customer reported code errors and problems in the new release to error data from previous versions. This post-mortem analysis is often performed manually by reviewing the historical data of code errors, which product features are affected, and in which product release. When this manual analysis reveals a pattern of product failures, the development organization may identify actions to be taken. Such actions may include, for example, software product development process improvements, such as more code reviews, more automation, improved test coverage, and a realignment of personnel allocation, such as assigning additional resources to focus on the new product functionality under development, error prone sections of the software code, and sections of the software code that have the most additional lines of code.

This reactive approach has disadvantages. Typically, a large amount of manual effort is required to review and analyze the customer-provided information. In addition, this analysis may require analyzing large amounts of historic code defect records. As well, code defects detected and reported by customers may result in corrective actions scheduled for future product versions rather than the current version under development. It would be advantageous to predict software quality for a product under development so as to be able to address potential problems in real time.

BRIEF SUMMARY

Embodiments of the present invention disclose a method, computer program product, and system for predicting software product quality. Real-time and historic software code metrics for a software product, real-time and historic software code defect data for the software product, and real-timer and historic test case-related data for the software product are received. A feature predicted fallibility is calculated that estimates the number of code defects for a new feature of the software product, based on the received real-time and historic software code metrics for a software product, and the received real-time and historic software code defect data for the software product. A product version projected fallibility is calculated that estimates the number of code defects for a new version of a software product, based on an average of all calculated feature predicted fallibilities for all new features of the new version of the software product. A test case related quality coefficient is calculated that estimates the likelihood of discovery of code defects in a new feature, based on a mathematical correlation between a test case related metric, and the received real-time and historic software code defect data for the software product. A feature quality index is calculated that is a qualitative indication of quality of the new code of a feature, based on the calculated feature predicted fallibility and the calculated test case related quality coefficient. A product quality index is calculated that is a qualitative indication of quality of the new version of the software product, based on an average of all calculated feature quality indexes for all new features of the new version of the software product. A report is then output that includes at least the calculated feature predicted fallibility, product version projected fallibility, test case related quality coefficient, feature quality index, and product quality index, whereby developer resources are directed to features of the software product for which the calculated values indicate likelihoods of a high defect densities.

DETAILED DESCRIPTION

Embodiments of the invention are general directed to a predictive failure product quality system for quantifying product, feature, and module quality and for providing projections and predictions of defect density and number of code defects, based on predictive models that analyze trends, patterns, and information from current and historical error reporting and other development-related data including test case-related information. Certain embodiments may be integrated into product lifecycle/change management tools and integrated development environments (IDEs).

Advantageously, the models perform automated analysis of the current and historical data, and do not rely on manual review and analysis of the data. As such, estimates and predictions of product and feature quality and defect density and number of code defects may be generated at any time during software product development and testing.

As new data is generated regarding errors encountered during product development, new problems are reported by customers for already released versions of the product, and new test cases are developed and executed, the predictive failure product quality system may perform on-demand data analytics to assess in real time the product quality. This analysis may provide valuable input in determining where to allocate personnel resources and which corrective actions should be taken. By performing this analysis during the product development cycle, the risk of customer dissatisfaction with a new product version may be reduced.

The predictive model of the predictive failure product quality system may receive historical data, including customer generated error reports, error reports created internally during product development and testing, coding metrics, such as estimated or current lines of code (LoC) for modules affected by code changes, and the results of test cases applied to the product software to test code changes.

To predict the impact of a new or changed feature or module, the predictive model may receive information related to the new or changed feature or module, such as modules affected by the feature or module change, and these module's characteristics and historical defect density, the number of lines of code estimated to be added to each of the modules touched by the new or changed modules, and test case information for the new or changed module, such as code coverage, modules and subroutines exercised, number of test cases created, test case size, test case duration, etc.

In an exemplary embodiment, the predictive failure product quality system may be viewed as including three main components. The first is an automated real-time data gathering component that receives data from one or more preferably heterogeneous data sources to create a comprehensive collection of historical homogenous error-related information. The second component is a predictive model for generating predictions, during software development, in terms of code defects and defect densities for new and updated software modules. The third main component may generate appropriate presentation of the results of the predictive model, such as reports, displays, etc. This information may identify areas of the software for which errors may have a significant impact on product quality, and may recommend reallocations of personnel resources.

Advantages of the exemplary and other embodiments of the invention include that these embodiments predict code defects and defect densities for new and updated software modules based on real-time data gathered for the software product during its development, including test case related information, and current customer error reports, rather than software metrics determined at the end of version or release development and customer error reports from the last released version of the software product. This may provide an opportunity to take corrective actions to improve product and feature quality at any time during the development cycle.

Figure 1:
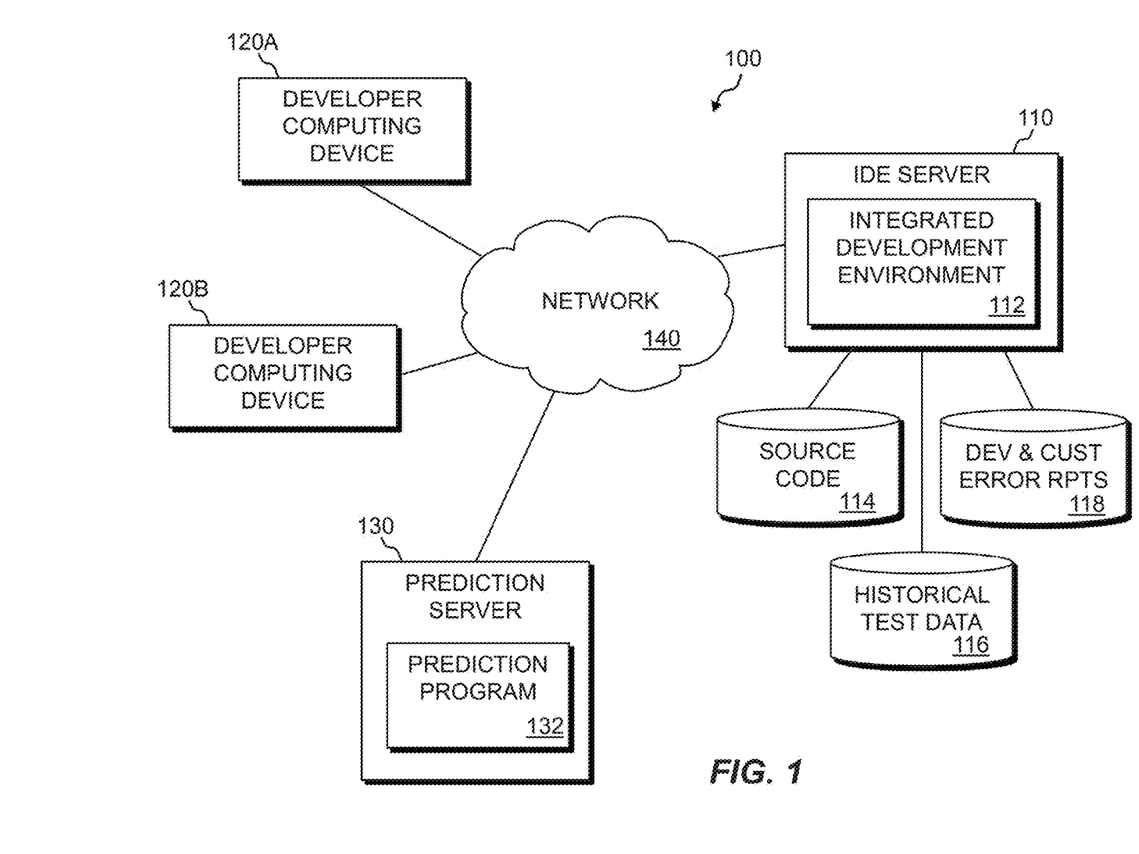
FIG. 1 is a functional block diagram illustrating a predictive failure product quality system, in accordance with an embodiment of the present invention.

FIG. 1 is a functional block diagram illustrating a predictive failure product quality system 100, in accordance with an embodiment of the present invention. In an exemplary embodiment, predictive failure product quality system 100 includes IDE server 110, developer computing devices 120, and prediction server 130, all interconnected over network 140.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between IDE server 110, developer computing devices 120, and prediction server 130, in accordance with embodiments of the invention.

In an exemplary embodiment, IDE server 110 represents a network platform that hosts IDE 112. IDE 112 further includes, or has access to, source code datastore 114, historical test data datastore 116, and developer and customer error report datastore 118.

In various embodiments, IDE server 110 may be a laptop computer, netbook computer, personal computer (PC), a desktop computer, in accordance with embodiments of the invention. IDE server 110 may include internal and external hardware components, as depicted and described in further detail below with reference to FIG. 5, below. In other embodiments, IDE server 110 may be implemented in a cloud computing environment, as described in relation to FIGS. 6 and 7, below.

In an exemplary embodiment, IDE 112 provides at least a code editor, compiler, and debugger to allow software developers, for example, via developer computing devices 120, to write software code, compile the code into modules, and test and debug the modules and execute test cases.

Source code datastore 114 represents a datastore in which the source code for one or more software products under development are stored. In certain embodiments, source code datastore 114 may be included in, and maintained by, a software version control system (not shown) that manages changes to the source code modules. In the exemplary embodiment, source code datastore also includes additional information related to source code modules, such as LoC, changed lines, which project task (feature or "line item") each source code module change is associated with, and compile and debug errors by module. This information may be provided and maintained, for example, by IDE 112, or by a software version control system that manages changes to the source code modules. In certain embodiments, this information is provided and maintained through a plug-in developed for use with IDE 112 or a software version control system that manages changes to the source code modules.

Historical test data datastore 116 represents a datastore in which information related to test cases is stored. Generally, a test case is a set of conditions under which one or more features of a software product are executed, along with the expected results, to determine whether the features are performing as expected. The conditions may include, for example, test data, pre-conditions, and post-conditions, developed for a particular test scenario. The term "test case" may also refer to the document that describes (or includes) the set of test data, pre-conditions, expected results, and post-conditions.

In an exemplary embodiment, historical test data datastore 116 includes the test cases created by a product test organization to determine whether the features of the software product are performing as expected, the code coverage and modules or subroutines exercised be each test case, the number of test cases created for the software product, test case size, test case execution duration, etc. Historical test data datastore 116 also includes historical data, such as test case failures, or defects discovered, by feature or module for previous versions of the software product, as well as up-to-date test case failures by feature or module for the version of the software product currently under development.

Developer and customer error report datastore 118 represents a datastore of error reports logged during development of a software product, including during development of previous versions and the current version of the software product under development, and error reports from customers (users) of the software product, including historical error reports for previously released versions of the software product and error reports for the currently released version of the software product. The error reports may originate from a variety of sources, such as IDE 112 during developer debugging of source code and developer execution of test cases, and from one or more internal or external customer error reporting mechanisms. The error reports may include such data as the descriptions of the error and the module(s) that caused the error.

Figure 5:
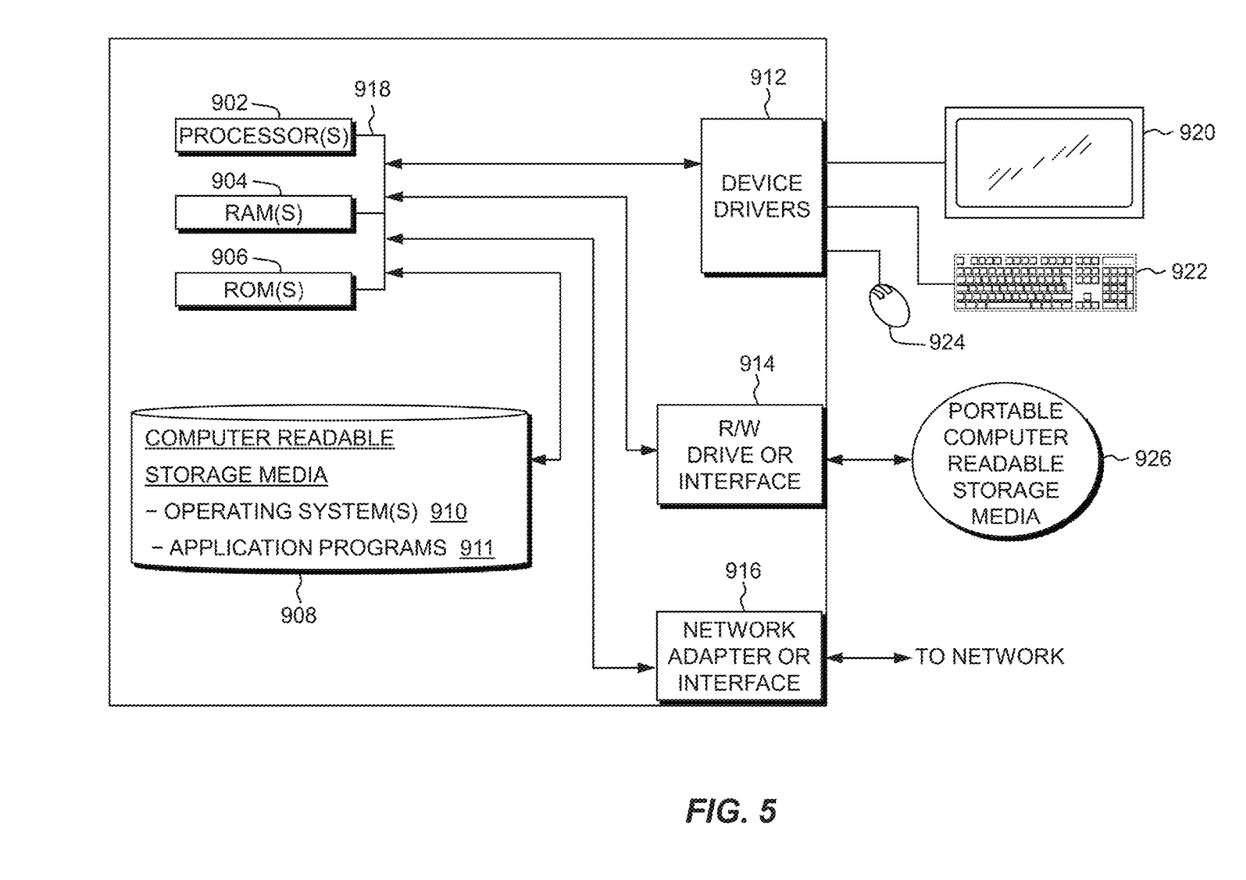
FIG. 5 depicts a block diagram of components of various computing devices of predictive failure product quality system of FIG. 1, in accordance with an embodiment of the present invention.
Figure 6:
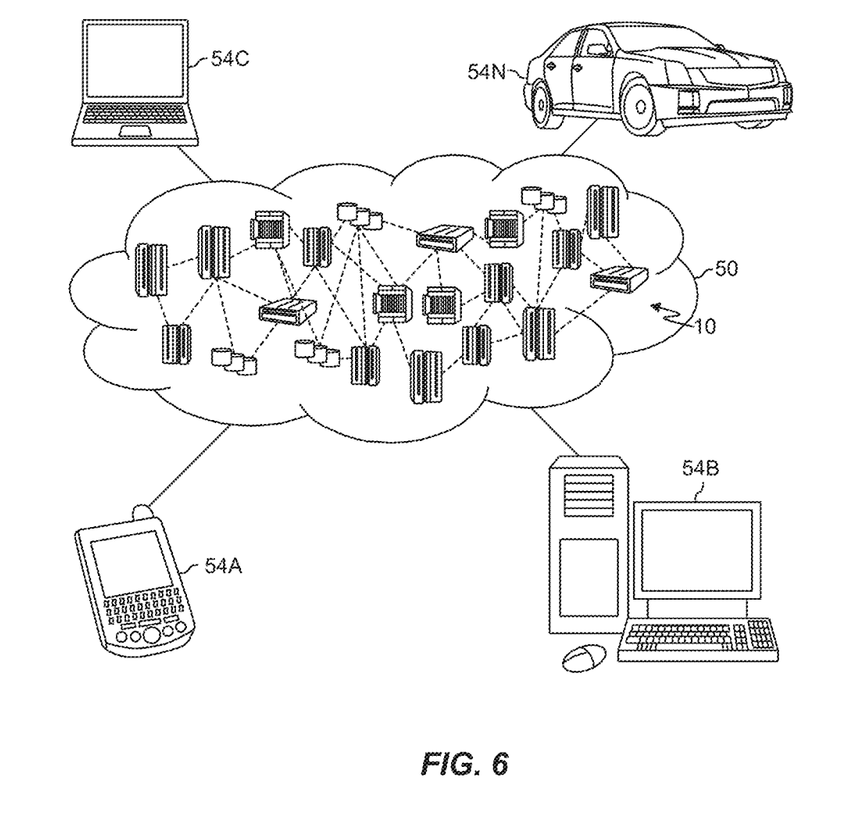
FIG. 6 depicts a cloud computing environment, in accordance with an embodiment of the present invention.

Source code datastore 114, historical test data datastore 116, and developer and customer error report datastore 118, may each reside, for example, on computer readable storage media 908 (FIG. 4), or on cloud based storage media 65 (FIG. 6).

Developer computing devices 120 represent platforms by which developers access IDE 112, via network 140, and perform software development activities to produce the software product. Typically, developer computing devices 120 will include a graphical user interface (not shown) for accessing IDE 112. The graphical user interface may be, for example, a web browser or a dedicated application residing on developer computing devices 120.

In various embodiments, each developer computing device 120 may be a laptop computer, netbook computer, personal computer (PC), or a desktop computer, in accordance with embodiments of the invention. A developer computing device 120 may include internal and external hardware components, as depicted and described in further detail below with reference to FIG. 5, below. In other embodiments, a developer computing device 120 may be implemented in a cloud computing environment, as described in relation to FIGS. 6 and 7, below.

Prediction server 130 represents a platform that hosts prediction program 132. In various embodiments, prediction server 130 may be a laptop computer, netbook computer, personal computer (PC), a desktop computer, in accordance with embodiments of the invention. Prediction server 130 may include internal and external hardware components, as depicted and described in further detail below with reference to FIG. 5, below. In other embodiments, prediction server 130 may be implemented in a cloud computing environment, as described in relation to FIGS. 6 and 7, below.

Figure 2:
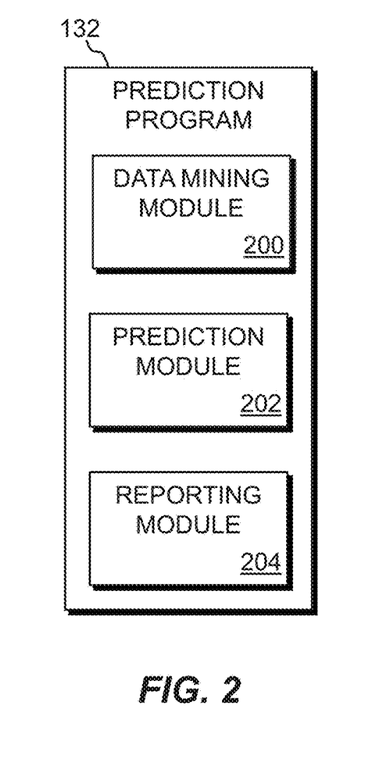
FIG. 2 is a functional block diagram illustrating a prediction program in the predictive failure product quality system of FIG. 2, in accordance with an embodiment of the present invention.

FIG. 2 is a block diagram illustrating the components of prediction program 132, in accordance with an embodiment of the present invention. Prediction program 132 may include data mining module 200, prediction module 202, and reporting module 204. In an exemplary embodiment of the invention, prediction program 132 operates generally to receive historical and up-to-date data from IDE 112 relating to source code defects and developer and customer error reports, to analyze the defect and error data, to produce quantitative predictive measures for the software product version currently under development, and to report out these quantitative predictive measures so that software development resources can be appropriately assigned such that the impact to customers of problem areas identified by the predictive measure is reduced.

Data mining module 200 operates general to automatically gather real-time data from one or more preferably heterogeneous data sources to create a comprehensive collection of historical homogenous error-related information. The data sources may include, for example, various debugging and testing components of IDE 112, various customer and developer error reporting systems, and various software version control systems. The collecting of the data may be performed, for example, by an automated data crawler or various add-ons and other interfaces to the product development testing and error reporting systems. This data may then be stored in historical test data datastore 116 and developer and customer error report datastore 118.

Prediction module 202 operates generally to calculate predictions, during software development, in terms of code defects and defect densities for new and updated software modules. Prediction module 202 operates on data gathered by data mining module 200 and stored in historical test data datastore 116 and developer and customer error report datastore 118.

In an exemplary embodiment, prediction module 202 produces at least the following quantitative predictive measures.

Feature Projected Fallibility

Feature projected fallibility is the number of projected code defects identified for a given product feature as a result of customer reported problems. For example, a feature Feature X is estimated to inject new lines of code in Module A and Module B. Specifically, Feature X is estimated to add 1,000 LoC to Module A, and 500 LoC to Module B. The historical data of reported customer problems that result in code changes for Module A after the injection of a certain number of LoC, as well as the calculated defect rate per hundred (C) lines of code in three different product versions are summarized in Table 1.

TABLE 1

| | Historical Defect Data-Module A | | |
|---|---|---|---|
| Product Version | LoC Injected | Number of Customer Reported Problems Requiring Code Changes | Defect Rate Per 100 Lines of Code (Probs/LoC (C)) |
| V10 | 1000 | 20 | 2 |
| V11 | 500 | 10 | 2 |
| V12 | 1000 | 40 | 4 |

A historical average of customer reported code defects per 100 lines of injected code for Module A, referred to as Module Median Defect Probability (MMDP(C)), may be calculated by averaging the defect rate per 100 lines of code for Module A for all product versions. For example, from Table 1:

$$MMDP(C)=(2+2+4)/3=2.7$$

Based on historical MMDP(C) for Module A, an estimated number of code defects resulting from customer reported problems for new Feature X can be calculated as follows:

(2.7 Historical Defects/100 LoC)×(1000 Estimated Injected LoC)=27 Estimated MMDP If, for example, the calculated historical MMDP(C) for Module B is 1.9, then, similarly to the above calculation for Module A, an estimated number of code defects resulting from customer reported problems for new Feature X can be calculated as follows:

(1.9 Historical Defects/100 LOC)×(500 Estimated Injected LoC)=9.5 Estimated MMDP To determine the estimated overall code defects resulting from customer reported problems for the new code injected for Feature X, the individual estimates for each of Module A and Module B are summed, yielding 27+9.5=35.5 total estimated MMDP.

Product Version Projected Fallibility

Product Version Projected Fallibility is the number of projected code defects identified for a given product version as a result of customer reported problems. Product Version Projected Fallibility may be calculated by summing the Feature Projected Fallibilities for feature updates in the new product version that will be injecting LoC. How to calculate Feature Projected Fallibility is described above.

Test Case Related Quality Coefficient

Test Case Related Quality Coefficient is a mathematical expression that correlates key test case related information as a measure of the likelihood of discovery of defects in a given feature. Test cases are created by product development organizations to verify that the code introduced by a given feature works as expected, and most defects are uncovered.

The ability of test cases to uncover defects is driven by a number of factors that can be different from test case to test case, from product to product, and from organization to organization. The quality of a test case provides an indication its ability to uncover defects. In an exemplary embodiment of the invention, the following test case factors may be used in a mathematical model for determining the Test Case Related Quality Coefficient: overall duration of the test case; number of "use cases" per each test case; test case size (if automated) or test case number of steps (if manual) needed to satisfy the "use case" for which the test case is written; number of overall modules exercised by the test case execution; number of modules exercised by the test case and that were changed by the feature update; and CPU consumption and/or I/O operations used by the test case.

In a preferred embodiment, current test case factor information as it develops for a feature under test is used. In other embodiments, historical test case factor information from previous development efforts for the feature may be used. In an exemplary embodiment, if homogenous test cases are used, that is, the test cases are similar in structure and are designed to verify only one "use case" of the feature, a Pearson correlation coefficient calculation may be used to determine a correlation between one or more of the test case factors and discovered defects per test case.

Figure 3:
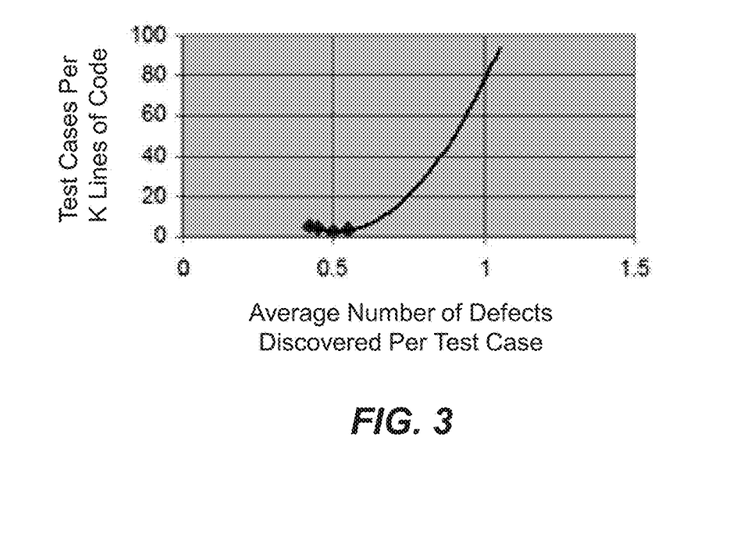
FIG. 3 is a graph that illustrates a correlation example derived from experimental data, in accordance with an embodiment of the present invention.

FIG. 3 illustrates a correlation example derived from experimental data. In this case study, the variables considered meaningful were the average number of defects uncovered per test case, and test cases per thousand lines of code. For this analysis, an X-Y scattering chart was used. The model was enhanced by tracing a polynomial trend line (order=2). This regression model was chosen in order to satisfy a value of R2 as close as possible to 1 (maximum correlation). Using the small illustrative sample of four data points shown in Table 2, the R2 value obtained was 0.90, indicating a very strong mathematical correlation between the variables considered.

TABLE 2

Correlation Data Points

| Feature | Defects Uncovered Per Test Case | Test Cases per K Lines of Code |
|---|---|---|
| V12 Feature 1 | 0.55 | 3.11 |
| V12 Feature 2 | 0.42 | 4.94 |
| V13 Feature 3 | 0.45 | 4.19 |
| V13 Feature 4 | 0.50 | 2.23 |

In other embodiments, a Negative Binomial Regression Analysis based method is used to determine the Test Case-Related Quality Coefficient from a set of test case factors.

Product and Feature Quality Index

Product and Feature Quality Index is a mathematical expression which can be used as an indication of the quality of the code introduced by a feature or set of features. Because different products and features may have different structures and different testing methodologies, each product or feature may use particular test case related information and calculations that have more meaning to the particular product or feature characteristics.

As an example, a certain feature may determine its associated feature quality index in accordance with the following equation:

Feature Quality Index=(Feature Projected Fallibility)*((Feature Projected Fallibility)/(Number of Test Cases)*(Defects Discovered per Test Case))

In this example, the Feature Quality Index could be defined as a positive decimal number. Using this equation, a lower Feature Quality Index value is better, and indicates a better projected feature quality. Table 3 illustrates the relation between Feature Quality Index to defects discovered through test cases. The values for Feature Projected Fallibility and Defects Discovered via Test Cases are arbitrary, but serve to demonstrate how the Quality Index changes in relation to the defects discovered through test cases, or how effective testing via test cases is.

TABLE 3

Relation of Feature Quality Index to Discovered Defects

| Case No. | Feature Projected Fallibility | Defects Discovered via Test Cases | Feature Quality Index (Lower = Better) |
|---|---|---|---|
| 1 | 30 | 1 | 900 |
| 2 | 30 | 15 | 60 |
| 3 | 30 | 30 | 30 |
| 4 | 30 | 50 | 18 |
| 5 | 30 | 100 | 9 |
| 6 | 30 | 300 | 3 |

In this example, a Quality Index value of 0 does not necessarily represent a feature with a zero defect density. Rather, the Quality Index value is a quantitative indication of a projected feature quality, and a measure of likelihood that the feature will have a reduced defect density. An overall Product Quality Index may be determined by calculating the average of all the Feature Quality Index values for a product.

Reporting module 204 operates general to produce appropriate presentations of the results of prediction module 202, such as reports, displays, etc. This information may identify areas of the software product for which errors may have a significant impact on product quality, and may be used to determine reallocations of personnel resources.

Figure 4:
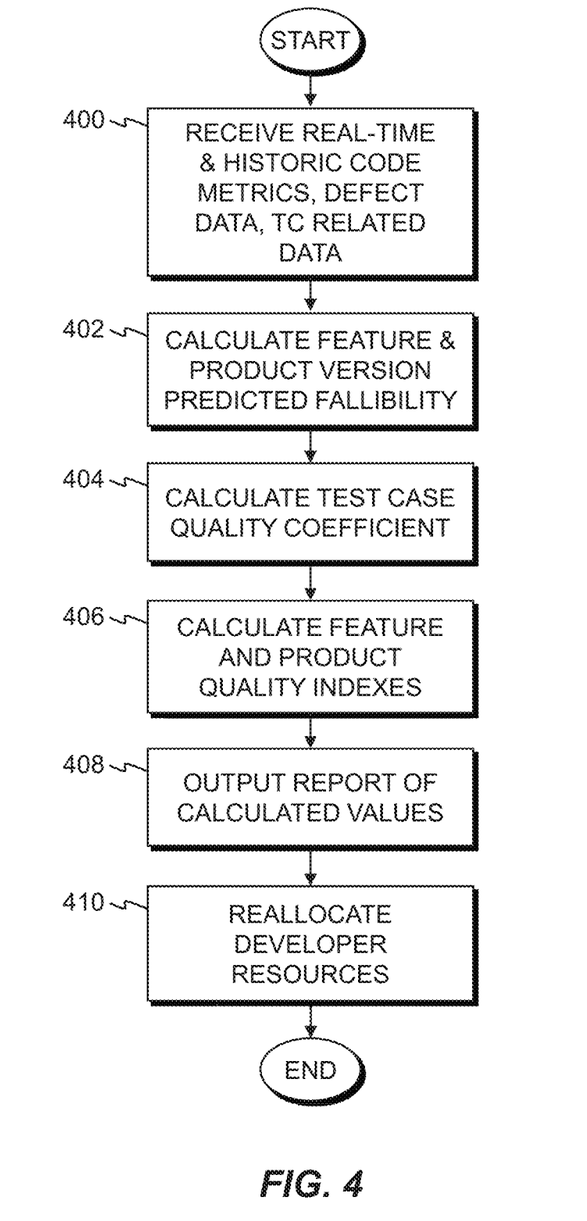
FIG. 4 is a flowchart illustrating the operational steps of the prediction program of FIG. 2, in accordance with an embodiment of the present invention.

FIG. 4 is a flowchart illustrating the operational steps of prediction program 132, in accordance with an embodiment of the present invention. Data mining module automatically gather real-time and historical code metrics, defect data, test case related data from various data sources, and stores this information in historical test data datastore 116 and developer and customer error report datastore 118 (step 400). Prediction module 202 calculates feature predicted fallibility values, based on the real-time and historic software code metrics for a software product, and the received real-time and historic software code defect data for the software product, and also the product version projected fallibility, based on an average of all calculated feature predicted fallibilities for all new features of the new version of the software product (step 402). Prediction module 202 then calculates the test case related quality coefficient that estimates the likelihood of discovery of code defects in a new feature, based on a mathematical correlation between a test case related metric, and the received real-time and historic software code defect data for the software product (step 404). Prediction module 202 then calculates the feature quality index that is a qualitative indication of quality of the new code of a feature, based on the calculated feature predicted fallibility and the calculated test case related quality coefficient, and the product quality index that is a qualitative indication of quality of the new version of the software product, based on an average of all calculated feature quality indexes for all new features of the new version of the software product (step 406).

After these values are calculated, reporting module 204 outputs a report that includes at least the calculated feature predicted fallibility, product version projected fallibility, test case related quality coefficient, feature quality index, and product quality index. Based on the report, the product development organization reallocates developer resources to features of the software product for which the calculated values indicate likelihoods of a high defect densities.

Advantages of embodiments of the invention may be realized in the integration of an appropriate mathematical model into a lifecycle/change management tools, the dynamic on-demand recalculation of the model results, and the use of test case-related information as a means to quantify the feature and overall product quality. A quantification of product quality may present an opportunity for a product development organization to take corrective actions, for example, realignment of personnel to focus on those features that are projected to have a high defect density, and attempt to reduce the probability of defects.

FIG. 5 depicts a block diagram of components of IDE server 110, developer computing devices 120, and prediction server 130, of predictive failure product quality system 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

IDE server 110, developer computing devices 120, and prediction server 130, may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, IDE 112 and/or prediction program 132, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

IDE server 110, developer computing devices 120, and prediction server 130, may also include a R/W drive or interface 914 to read from and write to one or more portable computer readable storage media 926. Application programs 911 on IDE server 110, developer computing devices 120, and prediction server 130, may be stored on one or more of the portable computer readable storage media 926, read via the respective R/W drive or interface 914 and loaded into the respective computer readable storage media 908.

IDE server 110, developer computing devices 120, and prediction server 130, may also include a network adapter or interface 916, such as a TCP/IP adapter card or wireless communication adapter (such as a 4G wireless communication adapter using OFDMA technology). Application programs 911 on computing device 106 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

IDE server 110, developer computing devices 120, and prediction server 130, may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 7:
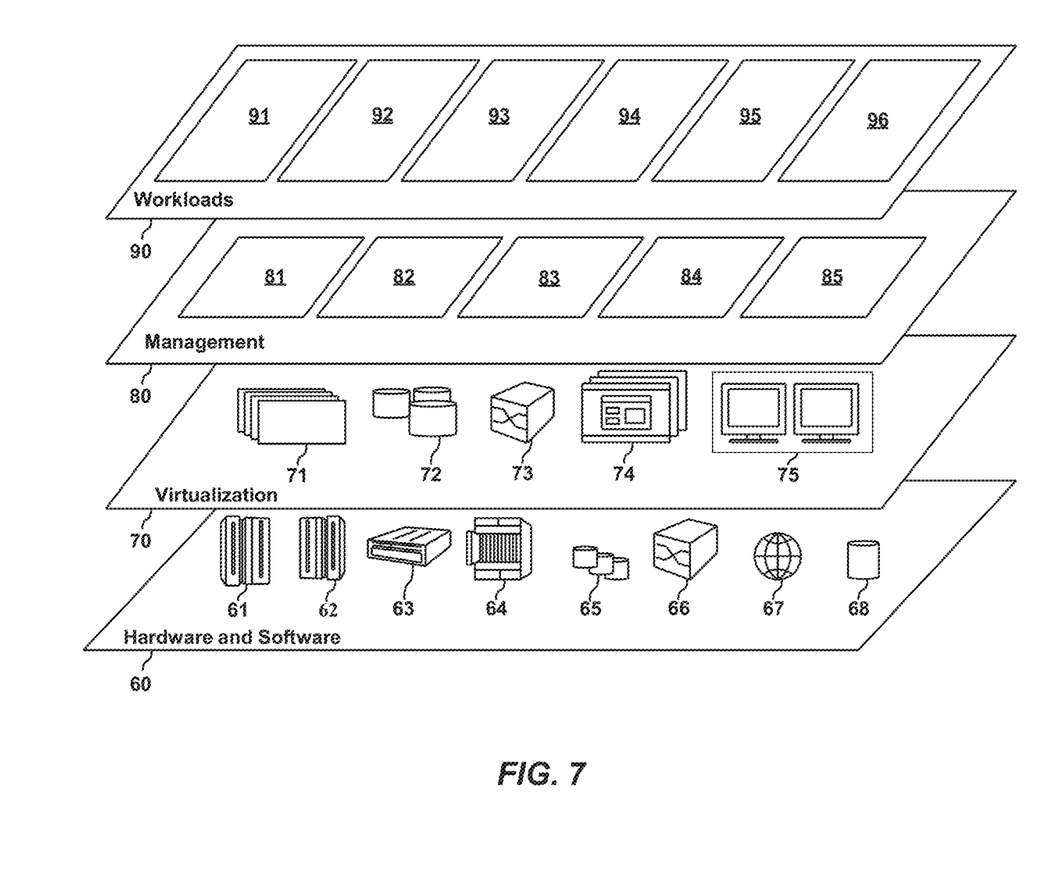
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive failure product quality system 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for predicting software product quality, the method comprising:
   receiving, by a computer over a network from an integrated development environment (IDE) server, real-time and historic software code metrics for a software product;
   receiving, by the computer over the network from the IDE server, real-time and historic software code defect data for the software product;
   receiving, by the computer over a network from the IDE server, real-time and historic test case-related data for the software product;
   calculating, by the computer, a feature predicted fallibility that estimates the number of code defects for a new feature of the software product, based on the received real-time and historic software code metrics for a software product, and the received real-time and historic software code defect data for the software product, as determined by calculating the average, over a plurality of product versions for the feature, of the quotient of the new lines of code injected into a product version for the feature divided by number of customer reported problems for the feature requiring code changes, and determining the feature predicted fallibility by calculating the product of the average quotient and the estimated lines of code that will be injected into a new product version for the feature;
   calculating, by the computer, a product version projected fallibility that estimates the number of code defects for a new version of a software product, based on an average of all calculated feature predicted fallibilities for all new features of the new version of the software product, as determined by calculating the sum of the feature projected fallibilities for all feature updates in the new product version that will be injecting lines of code;
   calculating, by the computer, a test case related quality coefficient that estimates the likelihood of discovery of code defects in a new feature, based on a mathematical correlation between a test case related metric, and the received real-time and historic software code defect data for the software product, as determined by calculating a Pearson Correlation Coefficient, over a plurality of features in a plurality of product versions, between defects uncovered per test case and test cases per thousand lines of code;
   calculating, by the computer, a feature quality index that is a qualitative indication of quality of the new code of a feature, based on the calculated feature predicted fallibility and the calculated test case related quality coefficient, as determined by calculating the product of the feature projected fallibility, the feature projected fallibility divided by the number of test cases, and the defects discovered per test case;
   calculating, by the computer, a product quality index that is a qualitative indication of quality of the new version of the software product, based on an average of all calculated feature quality indexes for all new features of the new version of the software product, as determined by calculating the average of all the feature quality index values for a product version; and
   outputting a report that includes at least the calculated feature predicted fallibility, product version projected fallibility, test case related quality coefficient, feature quality index, and product quality index, whereby developer resources are directed to features of the software product for which the calculated values indicate likelihoods of a high defect densities.

2. The method of claim 1, wherein software code defect data includes developer reported errors.

3. The method of claim 1, wherein test case-related data includes one or more of: test case code coverage, number of test cases created, test case size, overall duration of the test case; number of use cases per each test case; test case size; number of test case steps executed for a use case; number of modules exercised by the test case; number of modules exercised by the test case and that were changed; central processing unit (CPU) consumption; and input/output (I/O) operations used by the test case.

4. A computer program product for predicting software product quality, the computer program product comprising:
   one or more non-transitory computer-readable storage media and program instructions stored on the one or more non-transitory computer-readable storage media, the program instructions comprising:
   program instructions, executable by a computer, to receive, over a network from an integrated development environment (IDE) server, real-time and historic software code metrics for a software product;
   program instructions, executable by the computer, to receive, over the network from the IDE server, real-time and historic software code defect data for the software product;
   program instructions, executable by the computer, to receive, over the network from the IDE server, real-time and historic test case-related data for the software product;
   program instructions, executable by the computer, to calculate a feature predicted fallibility that estimates the number of code defects for a new feature of the software product, based on the received real-time and historic software code metrics for a software product, and the received real-time and historic software code defect data for the software product, as determined by calculating the average, over a plurality of product versions for the feature, of the quotient of the new lines of code injected into a product version for the feature divided by number of customer reported problems for the feature requiring code changes, and determining the feature predicted fallibility by calculating the product of the average quotient and the estimated lines of code that will be injected into a new product version for the feature;
   program instructions, executable by the computer, to calculate a product version projected fallibility that estimates the number of code defects for a new version of a software product, based on an average of all calculated feature predicted fallibilities for all new features of the new version of the software product, as determined by calculating the sum of the feature projected fallibilities for all feature updates in the new product version that will be injecting lines of code;

program instructions, executable by the computer, to calculate a test case related quality coefficient that estimates the likelihood of discovery of code defects in a new feature, based on a mathematical correlation between a test case related metric, and the received real-time and historic software code defect data for the software product, as determined by calculating a Pearson Correlation Coefficient, over a plurality of features in a plurality of product versions, between defects uncovered per test case and test cases per thousand lines of code;

program instructions, executable by the computer, to calculate a feature quality index that is a qualitative indication of quality of the new code of a feature, based on the calculated feature predicted fallibility and the calculated test case related quality coefficient, as determined by calculating the product of the feature projected fallibility, the feature projected fallibility divided by the number of test cases, and the defects discovered per test case;

program instructions, executable by the computer, to calculate a product quality index that is a qualitative indication of quality of the new version of the software product, based on an average of all calculated feature quality indexes for all new features of the new version of the software product, as determined by calculating the average of all the feature quality index values for a product version; and program instructions, executable by the computer, to output a report that includes at least the calculated feature predicted fallibility, product version projected fallibility, test case related quality coefficient, feature quality index, and product quality index, whereby the calculated values indicate likelihoods of a high defect densities.

5. The computer program product of claim 4, wherein software code defect data includes developer reported errors.

6. The computer program product of claim 4, wherein test case-related data includes one or more of: test case code coverage, number of test cases created, test case size, overall duration of the test case; number of use cases per each test case; test case size; number of test case steps executed for a use case; number of modules exercised by the test case; number of modules exercised by the test case and that were changed; central processing unit (CPU) consumption; and input/output (I/O) operations used by the test case.

7. A computer system for predicting software product quality, the computer system comprising:

one or more computer processors, a network adapter connected to a network, one or more computer-readable storage media, and program instructions stored on one or more of the computer-readable storage media for execution by at least one of the one or more processors, the program instructions comprising:

program instructions, executable by a computer, to receive, over a network from an integrated development environment (IDE) server, real-time and historic software code metrics for a software product;

program instructions, executable by the computer, to receive, over the network from the IDE server, real-time and historic software code defect data for the software product;

program instructions, executable by the computer, to receive, over the network from the IDE server, real-time and historic test case-related data for the software product;

program instructions, executable by the computer, to calculate a feature predicted fallibility that estimates the number of code defects for a new feature of the software product, based on the received real-time and historic software code metrics for a software product, and the received real-time and historic software code defect data for the software product, as determined by calculating the average, over a plurality of product versions for the feature, of the quotient of the new lines of code injected into a product version for the feature divided by number of customer reported problems for the feature requiring code changes, and determining the feature predicted fallibility by calculating the product of the average quotient and the estimated lines of code that will be injected into a new product version for the feature;

program instructions, executable by the computer, to calculate a product version projected fallibility that estimates the number of code defects for a new version of a software product, based on an average of all calculated feature predicted fallibilities for all new features of the new version of the software product, as determined by calculating the sum of the feature projected fallibilities for all feature updates in the new product version that will be injecting lines of code;

program instructions, executable by the computer, to calculate a test case related quality coefficient that estimates the likelihood of discovery of code defects in a new feature, based on a mathematical correlation between a test case related metric, and the received real-time and historic software code defect data for the software product, as determined by calculating a Pearson Correlation Coefficient, over a plurality of features in a plurality of product versions, between defects uncovered per test case and test cases per thousand lines of code;

program instructions, executable by the computer, to calculate a feature quality index that is a qualitative indication of quality of the new code of a feature, based on the calculated feature predicted fallibility and the calculated test case related quality coefficient, as determined by calculating the product of the feature projected fallibility, the feature projected fallibility divided by the number of test cases, and the defects discovered per test case;

program instructions, executable by the computer, to calculate a product quality index that is a qualitative indication of quality of the new version of the software product, based on an average of all calculated feature quality indexes for all new features of the new version of the software product, as determined by calculating the average of all the feature quality index values for a product version; and program instructions, executable by the computer, to output a report that includes at least the calculated feature predicted fallibility, product version projected fallibility, test case related quality coefficient, feature quality index, and product quality index, whereby the calculated values indicate likelihoods of a high defect densities.

8. The computer system of claim 7, wherein software code defect data includes developer reported errors.

9. The computer system of claim 7, wherein test case-related data includes one or more of: test case code coverage, number of test cases created, test case size, overall duration of the test case; number of use cases per each test case; test case size; number of test case steps executed for a use case; number of modules exercised by the test case; number of modules exercised by the test case and that were changed; central processing unit (CPU) consumption; and input/output (I/O) operations used by the test case.

* * * * *